(12) United States Patent
Edwards et al.

(10) Patent No.: US 12,341,429 B2
(45) Date of Patent: *Jun. 24, 2025

(54) SWITCHING REGULATOR WITH CONFIGURABLE SNUBBER (71) Applicant: TEXAS INSTRUMENTS INCORPORATED, Dallas, TX (US)

(72) Inventors: Henry L. Edwards, Garland, TX (US); Wei Da, Manchester, NH (US); Stephen Brink, Manchester, NH (US); Joseph Maurice Khayat, Bedford, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,510

(22) Filed: May 30, 2024

(65) Prior Publication Data

US 2024/0313653 A1 Sep. 19, 2024

Related U.S. Application Data

(63) Continuation of application No. 17/828,259, filed on May 31, 2022, now Pat. No. 12,027,978.

(51) Int. Cl.
*H02M 3/158* (2006.01)
*H02M 1/08* (2006.01)
*H02M 1/34* (2007.01)

(52) U.S. Cl.
CPC ............. *H02M 3/158* (2013.01); *H02M 1/08* (2013.01); *H02M 1/344* (2021.05)

(58) Field of Classification Search
CPC .......... H02M 3/158; H02M 1/344; H02M 1/08
See application file for complete search history.

(56) References Cited

U.S. PATENT DOCUMENTS

| | | |
|---|---|---|
| 8,299,841 B2 | 10/2012 | Fukuhara |
| 10,554,203 B1 | 2/2020 | Aras |
| 12,027,978 B2 * | 7/2024 | Edwards ............... H02M 1/342 |
| 2012/0126765 A1 | 5/2012 | Stone |
| 2018/0182749 A1 | 6/2018 | Dai |
| 2019/0173464 A1 | 6/2019 | Lin |
| 2020/0177090 A1 | 6/2020 | Braz |
| 2021/0119527 A1 | 4/2021 | Tan |
| 2021/0152082 A1 | 5/2021 | Ozanoglu |

* cited by examiner

*Primary Examiner* — Rafael O De Leon Domenech
(74) *Attorney, Agent, or Firm* — Charles F. Koch; Frank D. Cimino (57) ABSTRACT

A switching regulator includes a low-side switching transistor, a snubber transistor, a first pull-down transistor, and a second pull-down transistor. The low-side switching transistor includes a first current terminal and a second current terminal. The first current terminal is coupled to a switching node. The second current terminal is coupled to a ground terminal. The snubber transistor includes a first current terminal, a second current terminal, and a control terminal. The first current terminal is coupled to the switching node. The second current terminal is coupled to the ground terminal. The first pull-down transistor is coupled between the control terminal of the snubber transistor and the ground terminal. The second pull-down transistor is coupled between the control terminal of the snubber transistor and the ground terminal.

20 Claims, 10 Drawing Sheets

SWITCHING REGULATOR WITH CONFIGURABLE SNUBBER

CROSS REFERENCE TO RELATED APPLICATIONS

This application is a continuation of U.S. application Ser. No. 17/828,259 filed May 31, 2022, the entirety of which is hereby incorporated herein by reference.

BACKGROUND

A switching regulator is an electronic circuit that converts an input direct current (DC) voltage into one or more DC output voltages that are higher or lower in magnitude than the input DC voltage. A switching regulator that generates an output voltage lower than the input voltage is termed a buck or step-down regulator. A switching regulator that generates an output voltage higher than the input voltage is termed a boost or step-up regulator.

Some switching regulator topologies include a drive/power switch coupled at a switch node to an energy storage inductor/transformer. Electrical energy is transferred through the energy storage inductor/transformer to a load by alternately opening and closing the switch as a function of a switching signal. The amount of electrical energy transferred to the load is a function of the ON/OFF duty cycle of the switch and the frequency of the switching signal. Switching regulators are widely used in electronic devices, particularly battery powered devices, such as portable cellular phones, laptop computers, and other electronic systems in which efficient use of power is desirable.

SUMMARY

In one example, a switching regulator includes a low-side switching transistor, a snubber transistor, a first pull-down transistor, and a second pull-down transistor. The low-side switching transistor includes a first current terminal and a second current terminal. The first current terminal is coupled to a switching node. The second current terminal is coupled to a ground terminal. The snubber transistor includes a first current terminal, a second current terminal, and a control terminal. The first current terminal is coupled to the switching node. The second current terminal is coupled to the ground terminal. The first pull-down transistor is coupled between the control terminal of the snubber transistor and the ground terminal. The second pull-down transistor is coupled between the control terminal of the snubber transistor and the ground terminal.

In another example, a switching regulator includes a low-side switching transistor, a snubber transistor, and a control circuit. The low-side switching transistor includes a current terminal and a control terminal. The current terminal is coupled to a switching node. The snubber transistor includes a current terminal and a control terminal. The current terminal of the snubber transistor is coupled to the switching node. The control circuit is coupled to the low-side transistor, the snubber transistor, and the switching node. The control circuit includes a first pull-down transistor, a second pull-down transistor, and a third pull-down transistor. The first pull-down transistor is coupled to the control terminal of the snubber transistor. The second pull-down transistor is coupled to the control terminal of the snubber transistor. The third pull-down transistor is coupled to a control terminal of the low-side switching transistor. In a low-side transistor turn-off sequence, the control circuit is configured to activate the first pull-down transistor to turn off the snubber transistor, and activate the second pull-down transistor in conjunction with the first pull-down transistor. In the low-side transistor turn-off sequence, the control circuit is also configured to deactivate the first pull-down transistor after a predetermined time, while the second pull-down transistor remains active, and activate the third pull-down transistor to turn off the low-side switching transistor responsive to the control voltage at the control terminal of the snubber transistor being less than a predetermined voltage.

In a further example, a buck switching regulator includes an inductor, a low-side switching transistor, a snubber transistor, and a control circuit. The low-side switching transistor includes a first current terminal, a second current terminal, and a control terminal. The first current terminal is coupled to the inductor. The second current terminal is coupled to a ground terminal. The snubber transistor includes a first current terminal, a second current terminal, and a control terminal. The first current terminal is coupled to the inductor. The second current terminal is coupled to the ground terminal. The control circuit is coupled to the low-side switching transistor, and the snubber transistor. The control circuit includes a first pull-down transistor, a second pull-down transistor, a third pull-down transistor, and a fourth pull-down transistor. The first pull-down transistor is coupled between the control terminal of the snubber transistor and the ground terminal. The second pull-down transistor is coupled between the control terminal of the snubber transistor and the ground terminal. The third pull-down transistor is coupled between the control terminal of the snubber transistor and the ground terminal. The fourth pull-down transistor is coupled between the control terminal of the low-side switching transistor and the ground terminal.

DETAILED DESCRIPTION

Figure 1A:
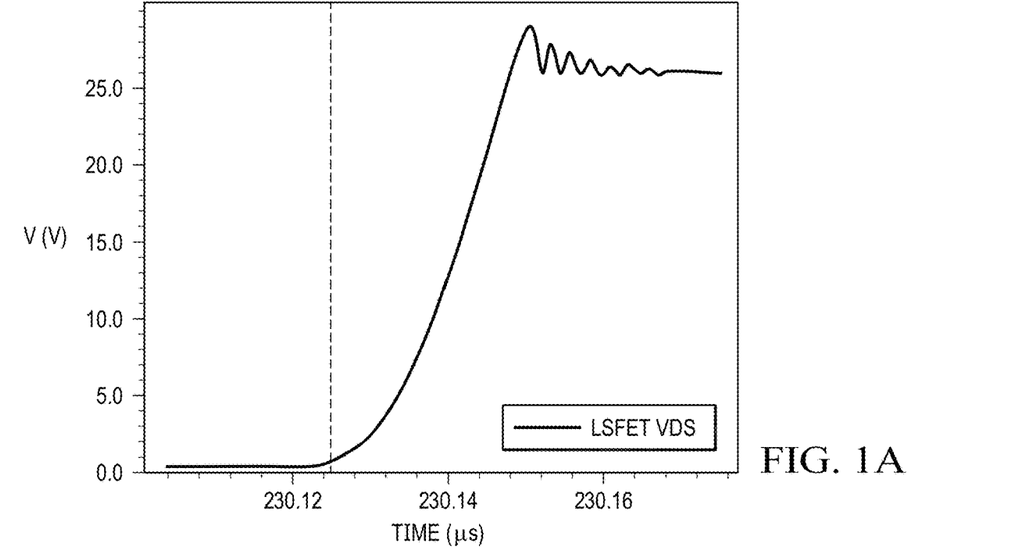
FIGS. 1A-1C are graphs showing example drain-source voltage ($V_{DS}$) and gate-source voltage ($V_{GS}$) of a low-side switching transistor as the low-side switching transistor is turned off.
Figure 1B:
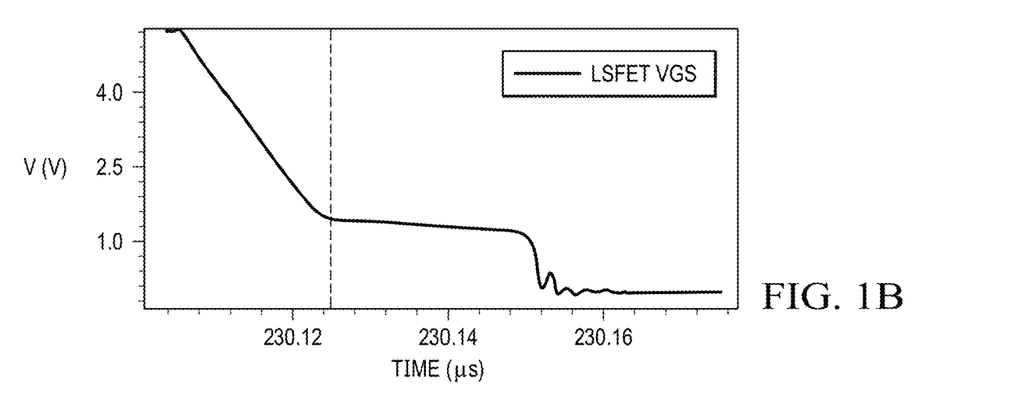
Figure 1C:
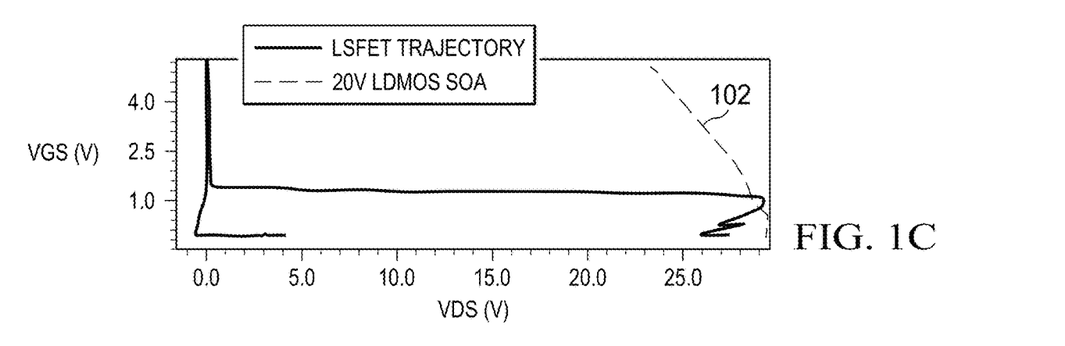

In a step-down (buck) switching regulator, a high-side switching transistor is turned on to charge an inductor, and a low-side switching transistor is turned on to discharge the inductor. When the inductor is discharged and inductor current flow is negative (through the low-side switching transistor to ground), the voltage across the low-side switching transistor (the drain-source voltage ($V_{DS}$)) increases when the low-side switching transistor is turned off. If the $V_{DS}$ exceeds the safe operating voltage of the low-side switching transistor, the low-side switching transistor may be damaged. FIGS. 1A-1C are graphs showing example $V_{DS}$ and gate-source voltage ($V_{GS}$) of a low-side switching transistor as the low-side switching transistor is turned off. FIG. 1A shows $V_{DS}$, and FIG. 1B shows $V_{GS}$. As $V_{GS}$ falls in FIG. 1B, to turn off the low-side switching transistor, $V_{DS}$ increases. The rise of $V_{DS}$ boosts $V_{GS}$ through the drain-gate capacitance of the low-side switching transistor. FIG. 1C is a graph showing $V_{DS}$ versus $V_{GS}$ for the low-side switching transistor. FIG. 1C also includes a curve 102 illustrating the safe operating area of the low-side switching transistor. FIG. 1C shows that when the low-side switching transistor is turned off, $V_{DS}$ may be outside of the safe operating area of the low-side switching transistor, which may damage the low-side switching transistor.

Various control techniques have been implemented to prevent damage to the low-side switching transistor. For example, in some switching regulators, the low-side switching transistor may be turned off and on in multiple stages. Some switching regulators may include a dedicated snubber transistor in parallel with the low-side switching transistor, which consumes substantial die area.

The switching regulators described herein include a snubber transistor that is configured to control ringing and to conduct inductor current in parallel with the low-side switching transistor. The snubber transistor sinks negative inductor current while the low-side switching transistor is soft switching. The snubber transistor may be rated for operation at a higher $V_{DS}$ than the low-side switching transistor. The snubber transistor may operate as part of the low-side switching transistor, which allows for a reduction in the area of the low-side switching transistor and a reduction in the voltage rating of the low-side switching transistor.

Figure 2:
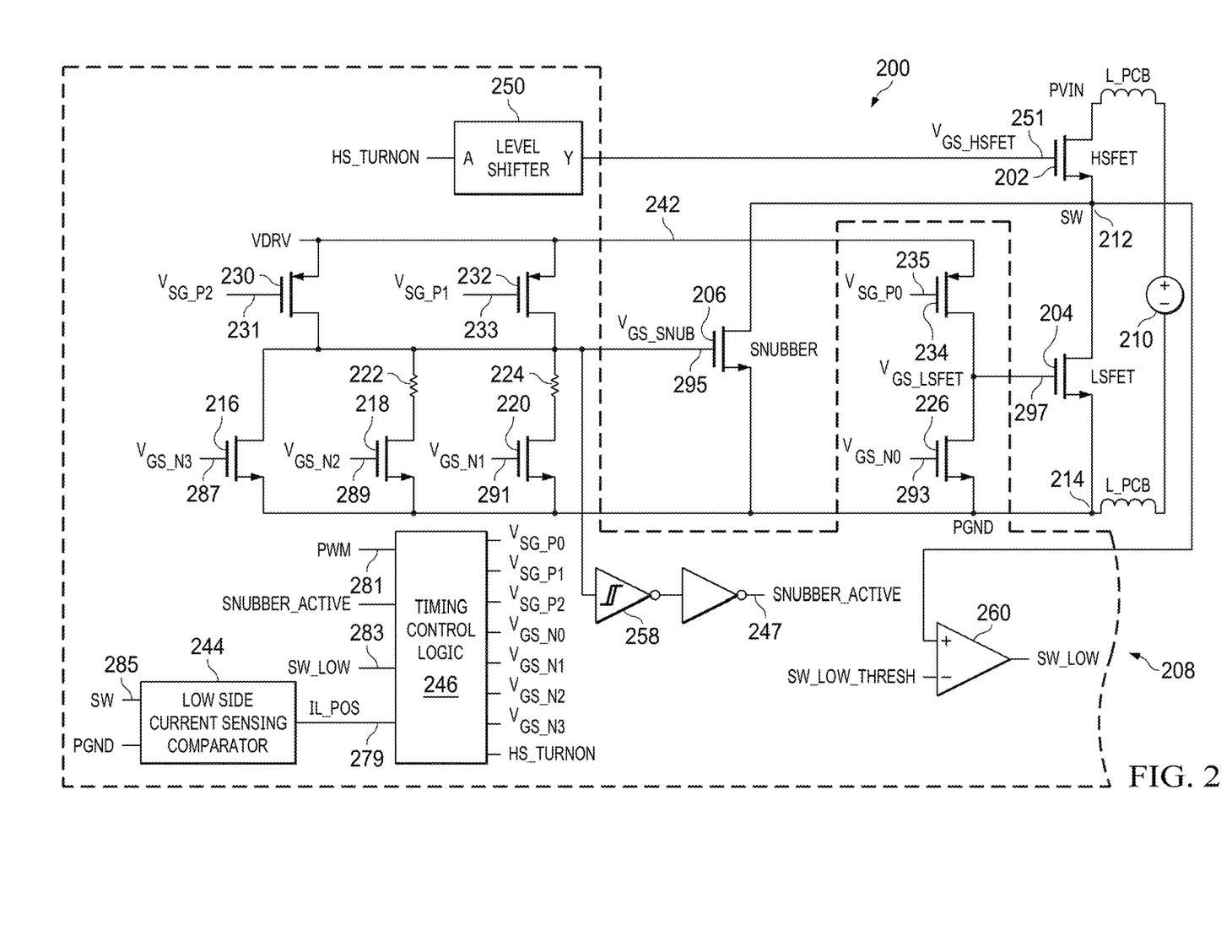
FIG. 2 is a schematic level diagram showing a portion of an example buck switching regulator.

FIG. 2 is a schematic level diagram showing a portion of an example buck switching regulator 200. The buck switching regulator 200 includes a high-side switching transistor 202, a low-side switching transistor 204, a snubber transistor 206, a control circuit 208, and a voltage source 210. The high-side switching transistor 202, the low-side switching transistor 204 and the snubber transistor 206 may be N-channel field effect transistors (NFETs). In some implementations, the snubber transistor 206 may have a higher $V_{DS}$ rating than the low-side switching transistor 204. The high-side switching transistor 202 includes a drain coupled to the voltage source 210 (L_PCB represents parasitic inductance), and a source coupled to a switching node 212. A gate of the high-side switching transistor 202 is coupled to the control circuit 208. The control circuit 208 activates the high-side switching transistor 202 to charge an inductor (not shown) coupled to the switching node 212. The control circuit 208 activates the high-side switching transistor 202 based on a pulse width modulation (PWM) signal 281.

The low-side switching transistor 204 includes a first current terminal (drain) coupled to the switching node 212, and a second current terminal (source) coupled to a ground terminal 214. A control terminal (gate) of the low-side switching transistor 204 is coupled to the control circuit 208. The control circuit 208 activates the low-side switching transistor 204 to discharge the inductor coupled to the switching node 212.

The snubber transistor 206 includes a first current terminal (drain) coupled to the switching node 212, and a second current terminal (source) coupled to the ground terminal 214. A control terminal (gate) of the low-side switching transistor 204 is coupled to the control circuit 208. The control circuit 208 controls the snubber transistor 206 to protect the low-side switching transistor 204, by allowing soft switching of the low-side switching transistor 204, and operates the snubber transistor 206 in conjunction with the low-side switching transistor 204, allowing the size of the low-side switching transistor 204 to be reduced. For example, the snubber transistor 206 remains active while the low-side switching transistor 204 is active to couple the switching node 212 to ground during each switching cycle.

The control circuit 208 includes a pull-down transistor 216, a pull-down transistor 218, a pull-down transistor 220, and a pull-down transistor 226. The pull-down transistor 216, the pull-down transistor 218, the pull-down transistor 220, and the pull-down transistor 226 may be NFETs. The pull-down transistor 216, the pull-down transistor 218, and the pull-down transistor 220 are coupled to the gate of the snubber transistor 206 to control turn-off of the snubber transistor 206. The pull-down transistor 226 is coupled to the gate of the low-side switching transistor 204 to control turn-off of the low-side switching transistor 204. A first current terminal (drain) of the pull-down transistor 226 is coupled to the gate of the low-side switching transistor 204, and a second current terminal (source) of the pull-down transistor 226 is coupled to the ground terminal 214.

The pull-down transistor 216 includes a current terminal (drain) coupled to the gate of the snubber transistor 206, and current terminal (source) coupled to the ground terminal 214. A first current terminal (drain) of the pull-down transistor 218 is coupled to the gate of the snubber transistor 206 via a resistor 222, and a second current terminal (source) of the pull-down transistor 218 is coupled to the ground terminal 214. A first current terminal (drain) of the pull-down transistor 220 is coupled to the gate of the snubber transistor 206 via a resistor 224, and second current terminal (source) of the pull-down transistor 220 is coupled to the ground terminal 214. The resistance of the resistor 222 may be greater than the resistance of the resistor 224, so that the pull-down transistor 220 provides a stronger pull-down than the pull-down transistor 218 (the pull-down transistor 220 sinks more current than the pull-down transistor 218). For example, the resistor 222 may have a resistance of about 300 ohms and the resistor 224 may have a resistance of about 54 ohms. The resistor 222 and the resistor 224 may have other values in various implementations of the control circuit 208.

A timing control logic circuit 246 controls the pull-down transistor 216, the pull-down transistor 218, the pull-down transistor 220, and the pull-down transistor 226. The timing control logic circuit 246 includes digital circuitry that generates the control signals output by the timing control logic circuit 246. A control terminal (gate) of the pull-down transistor 226 is coupled to an output of the timing control logic circuit 246. A control terminal (gate) of the pull-down transistor 220 is coupled to an output of the timing control logic circuit 246. A control terminal (gate) of the pull-down transistor 218 is coupled to an output of the timing control logic circuit 246. A control terminal (gate) of the pull-down transistor 216 is coupled to an output of the timing control logic circuit 246. Operation of the pull-down transistor 216, the pull-down transistor 218, the pull-down transistor 220, and the pull-down transistor 226, and the timing control logic circuit 246 are described with reference to FIGS. 3-7.

The control circuit 208 also includes a pull-up transistor 230, a pull-up transistor 232, and a pull-up transistor 234. The pull-up transistor 230 and the pull-up transistor 232 are coupled to the gate of the snubber transistor 206 to control turn-on of the snubber transistor 206. The pull-up transistor 234 is coupled to the gate of the low-side switching transistor 204 to control turn-on of the low-side switching transistor 204. The pull-up transistor 230, the pull-up transistor 232, and the pull-up transistor 234 may be p-channel field effect transistors (PFETs). The channel width of the pull-up transistor 232 may be greater than the channel width of the pull-up transistor 230, so that the pull-up transistor 232 provides stronger pull-up than the pull-up transistor 230. A first current terminal (drain) of the pull-up transistor 230 is coupled to the gate of the snubber transistor 206, and a second current terminal (source) of the pull-up transistor 230 is coupled to a drive voltage terminal 242. A first current terminal (drain) of the pull-up transistor 232 is coupled to the gate of the snubber transistor 206, and a second current terminal (source) of the pull-up transistor 232 is coupled to the drive voltage terminal 242.

A control terminal (gate) of the pull-up transistor 230 is coupled to an output of the timing control logic circuit 246. A control terminal (gate) of the pull-up transistor 232 is coupled to an output of the timing control logic circuit 246. A first current terminal (drain) of the pull-up transistor 234 is coupled to the gate of the low-side switching transistor 204, and a second current terminal (source) of the pull-up transistor 234 is coupled to the drive voltage terminal 242. A control terminal (gate) of the pull-up transistor 234 is coupled to an output of the timing control logic circuit 246. Operation of the pull-up transistor 230, the pull-up transistor 232, the pull-up transistor 234, and the timing control logic circuit 246 are described with reference to FIGS. 3-7.

The 208 includes a comparator 244 and a comparator 260. The comparator 244 compares current flow at the switching node 212 to ground to determine whether the current flowing in the switching node 212 is positive or negative. The comparator 244 continuously monitors switch node current while the low-side switching transistor 204 is on and holds the latched state of the switch node current while the low-side switching transistor 204 is off. The comparator 260 compares the switch node voltage 285 to a predetermined threshold voltage (e.g., about 2 volts) to determine whether the switch node voltage 285 is below the threshold voltage. The timing control logic circuit 246 includes a second input coupled to the output of the comparator 244, and a third input coupled to the output of the comparator 260. A fourth input of the timing control logic circuit 246 is coupled to the gate of the snubber transistor 206 via the Schmitt trigger 258.

Figure 3:
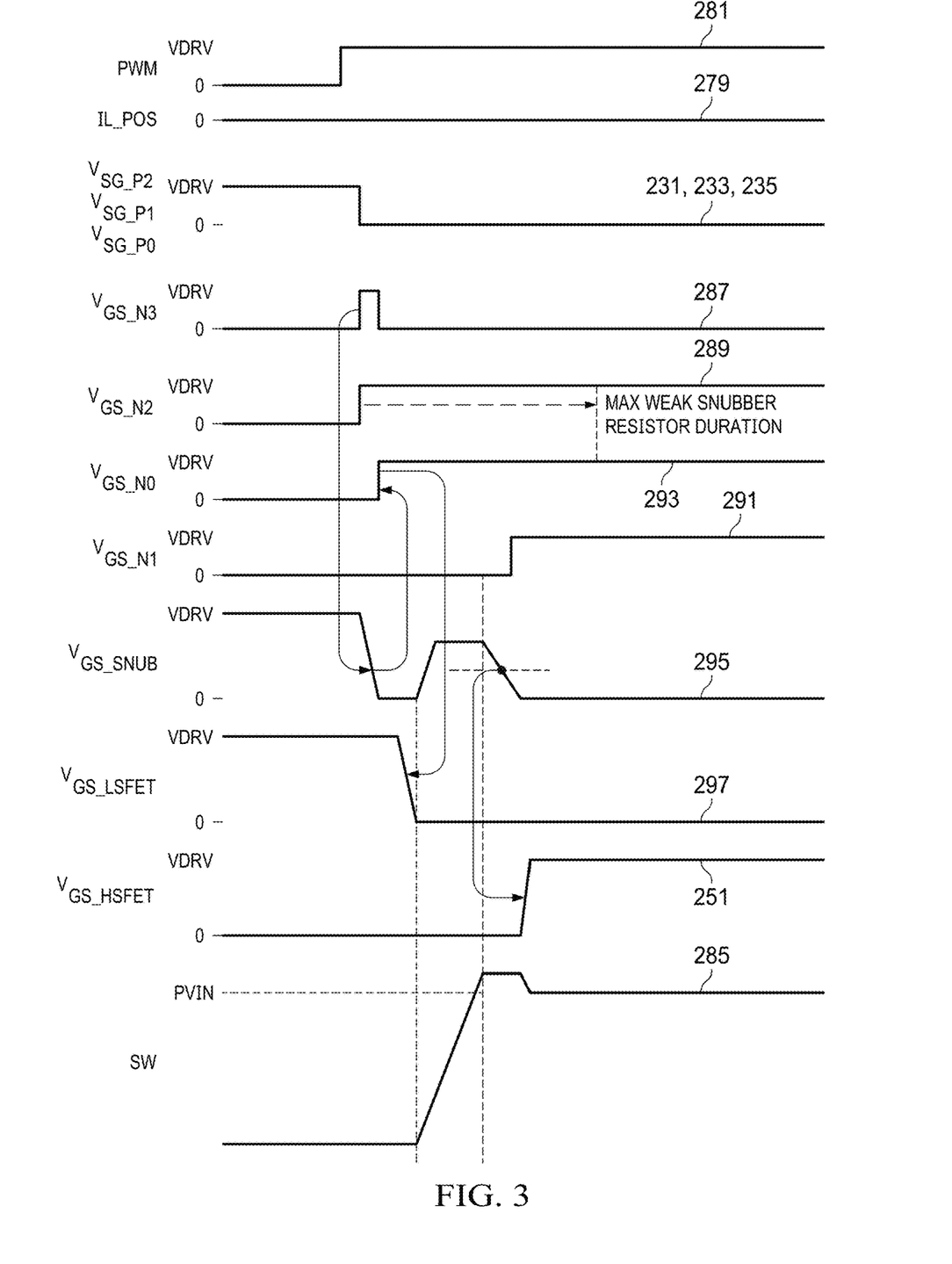
FIG. 3 is a timing diagram of example signals in buck switching regulator of FIG. 2 during a low-side switching transistor turn-off sequence with negative valley current.

In a low-side switching transistor turn-off sequence, the control circuit 208 sequences the activation of the pull-down transistor 216, the pull-down transistor 218, the pull-down transistor 220, and pull-down transistor 226 to protect the low-side switching transistor 204. FIG. 3 is a timing diagram of example signals in the buck switching regulator 200 during a low-side switching transistor 204 turn-off sequence with negative valley current. In FIG. 3, a rising edge of the PWM signal 281 initiates the turn-off sequence. The inductor current direction signal 279 is a logic low to indicate negative inductor current. The low-to-high transition of the PWM signal 281 triggers the timing control logic circuit 246 to turn off the pull-up transistor 230, the pull-up transistor 232, and the pull-up transistor 234, as illustrated by the signals VGS_P2 231, VGS_P1 233, and VGS_P0 235 representing the source-gate voltages of the pull-up transistor 230, the pull-up transistor 232, and the pull-up transistor 234, disabling pull-up of the gate of the low-side switching transistor 204 and pull-up of the gate of the snubber transistor 206.

Responsive to the rising edge of the PWM signal 281, the timing control logic circuit 246 generates a pulse on $V_{GS}$_N3 signal 287 that activates the pull-up transistor 230 to discharge the gate of the snubber transistor 206 ($V_{GS}$_SNUB signal 295). The timing control logic circuit 246 activates the $V_{GS}$_N2 signal 289 in conjunction with the $V_{GS}$_N3 signal 287 to turn on the pull-down transistor 218 and pull down the gate of the snubber transistor 206 through the resistor 222. The decrease in $V_{GS}$_SNUB signal 295 activates the SNUBBER_ACTIVE signal 247. Responsive to a falling edge of the SNUBBER_ACTIVE signal 247, the timing control logic circuit 246 resets the pulse provided on the $V_{GS}$_N3 signal 287, and activates the pull-down transistor 226 ($V_{GS}$_N0 signal 293) to turn off the low-side switching transistor 204 ($V_{GS}$_LSFET signal 297). The switch node voltage 285 rises responsive to turning off the low-side switching transistor 204, and the $V_{GS}$_SNUB signal 295 rises due to coupling through the drain-gate capacitance of the snubber transistor 206. The SNUBBER_ACTIVE signal 247 goes high responsive to the rise in the $V_{GS}$_SNUB signal 295. After the switch node voltage transition, the $V_{GS}$_SNUB signal 295 decreases producing a falling edge on the SNUBBER_ACTIVE signal 247. Responsive to the falling edge of the SNUBBER_ACTIVE signal 247, the timing control logic circuit 246 activates of the high-side switching transistor 202 ($V_{GS}$_HSFET 251), and activates the pull-down transistor 220 ($V_{GS}$_N1 signal 291), to pull-down the gate of the snubber transistor 206 through the resistor 224.

Figure 4:
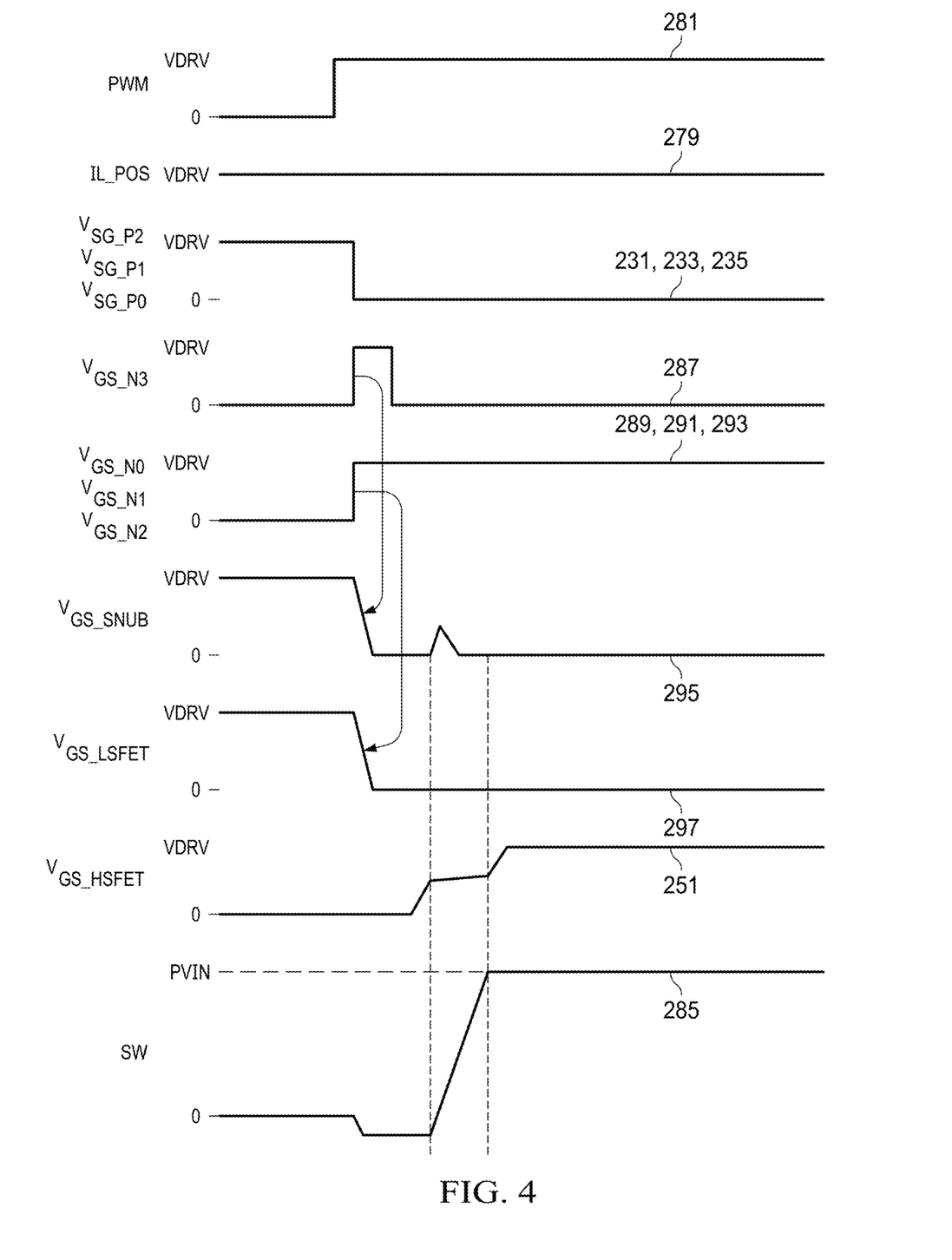
FIG. 4 is a timing diagram of example signals in the buck switching regulator of FIG. 2 during a low-side switching transistor turn-off sequence with positive valley current.

FIG. 4 is a timing diagram of example signals in the buck switching regulator 200 during a low-side switching transistor 204 turn-off sequence with positive valley current. In FIG. 4, a rising edge of the PWM signal 281 initiates the turn-off sequence. The inductor current direction signal 279 is a logic high to indicate positive current flow in the inductor. The low-to-high transition of the PWM signal 281 triggers the timing control logic circuit 246 to turn off the pull-up transistor 230, the pull-up transistor 232, and the pull-up transistor 234, as illustrated by the signals VGS_P2 231, VGS_P1 233, and VGS_P0 235 representing the source-gate voltages of the pull-up transistor 230, the pull-up transistor 232, and the pull-up transistor 234, disabling pull-up of the gate of the low-side switching transistor 204 and pull-up of the gate of the snubber transistor 206.

Responsive to the rising edge of the PWM signal 281, the timing control logic circuit 246 generates a pulse on $V_{GS}$_N3 signal 287 that activates the pull-up transistor 230 to discharge the gate of the snubber transistor 206 ($V_{GS}$_SNUB signal 295). The timing control logic circuit 246 causes the $V_{GS}$_N2 signal 289, $V_{GS}$_N1 signal 291, and the $V_{GS}$_N0 signal 293 to rise in conjunction with the $V_{GS}$_N3 signal 287 to turn on the pull-down transistor 218, the pull-down transistor 220, and the pull-down transistor 226, and pull down the gate of the snubber transistor 206 ($V_{GS}$_SNUB signal 295) and the gate of the low-side switching transistor 204 ($V_{GS}$_LSFET signal 297). The decrease in $V_{GS}$_SNUB signal 295 activates the SNUBBER_ACTIVE signal 247. Responsive to a falling edge of the SNUBBER_ACTIVE signal 247, the timing control logic circuit 246 resets the pulse provided on the $V_{GS}$_N3 signal 287. Responsive to the rising edge of the PWM signal 281, the timing control logic circuit 246 also turns on the high-side switching transistor 202 ($V_{GS}$_HSFET 251), which causes the switch node voltage 285 to increase.

Figure 5:
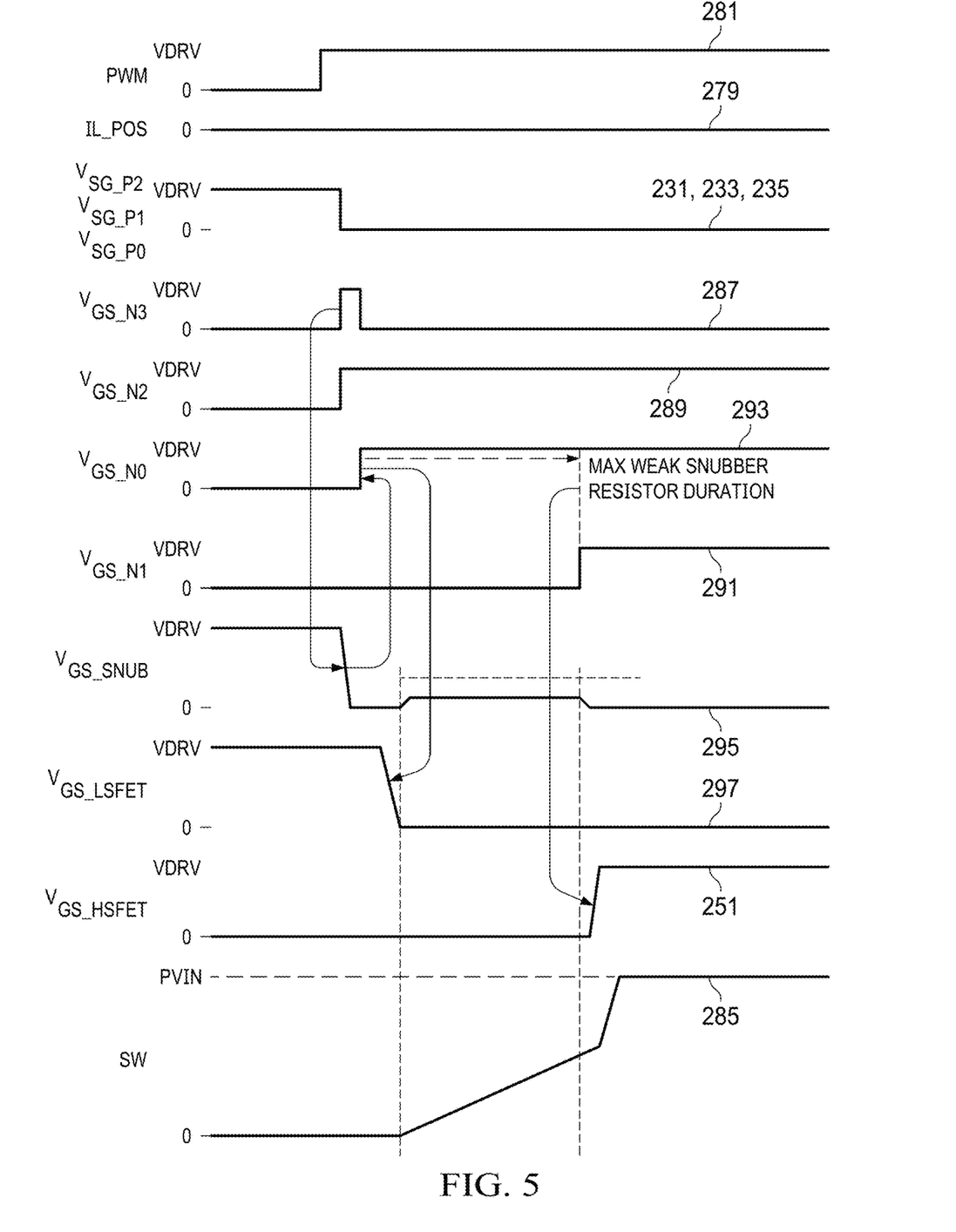
FIG. 5 is a timing diagram of example signals in the buck switching regulator of FIG. 2 during a low-side switching transistor turn-off sequence with negative valley current that is smaller than in FIG. 3.

FIG. 5 is a timing diagram of example signals in the buck switching regulator 200 during a low-side switching transistor 204 turn-off sequence with negative valley current that is smaller than in FIG. 3. In FIG. 5, a rising edge of the PWM signal 281 initiates the turn-off sequence. The inductor current direction signal 279 is a logic low to indicate negative inductor current. The low-to-high transition of the PWM signal 281 triggers the timing control logic circuit 246 to turn off the pull-up transistor 230, the pull-up transistor 232, and the pull-up transistor 234, as illustrated by the signals VGS_P2 231, VGS_P1 233, and VGS_P0 235 representing the source-gate voltages of the pull-up transistor 230, the pull-up transistor 232, and the pull-up transistor 234, disabling pull-up of the gate of the low-side switching transistor 204 and pull-up of the gate of the snubber transistor 206.

Responsive to the rising edge of the PWM signal 281, the timing control logic circuit 246 generates a pulse on $V_{GS}$_N3 signal 287 that activates the pull-up transistor 230 to discharge the gate of the snubber transistor 206 ($V_{GS}$_SNUB signal 295). The timing control logic circuit 246 activates the $V_{GS}$_N2 signal 289 in conjunction with the $V_{GS}$_N3 signal 287 to turn on the pull-down transistor 218 and pull down the gate of the snubber transistor 206 through the resistor 222. The decrease in $V_{GS}$_SNUB signal 295 activates the SNUBBER_ACTIVE signal 247. Responsive to a falling edge of the SNUBBER_ACTIVE signal 247, the timing control logic circuit 246 resets the pulse provided on the $V_{GS}$_N3 signal 287, and activates the pull-down transistor 226 ($V_{GS}$_N0 signal 293) to turn off the low-side switching transistor 204 ($V_{GS}$_LSFET signal 297). The switch node voltage 285 rises responsive to turning off the low-side switching transistor 204, and the $V_{GS}$_SNUB signal 295 increases due to coupling through the drain-gate capacitance of the snubber transistor 206. Because the negative valley current is relatively small, the switch node voltage 285 rises slowly (relative to FIG. 1), and the increase in the $V_{GS}$_SNUB signal 295 is also small (relative to FIG. 1). Due to the slow rise time of the switch node voltage 285, and the resulting small increase in the $V_{GS}$_SNUB signal 295, a second falling edge of the $V_{GS}$_SNUB signal 295 is not detected, and a timer started with activation of the pull-down transistor 226 expires. With expiration of the timer (e.g., expiration of about 36 nanoseconds), the timing control logic circuit 246 activates of the high-side switching transistor 202 ($V_{GS}$_HSFET), and activates the pull-down transistor 220 ($V_{GS}$_N1 signal 291), to pull-down the gate of the snubber transistor 206 through the resistor 224.

Figure 6:
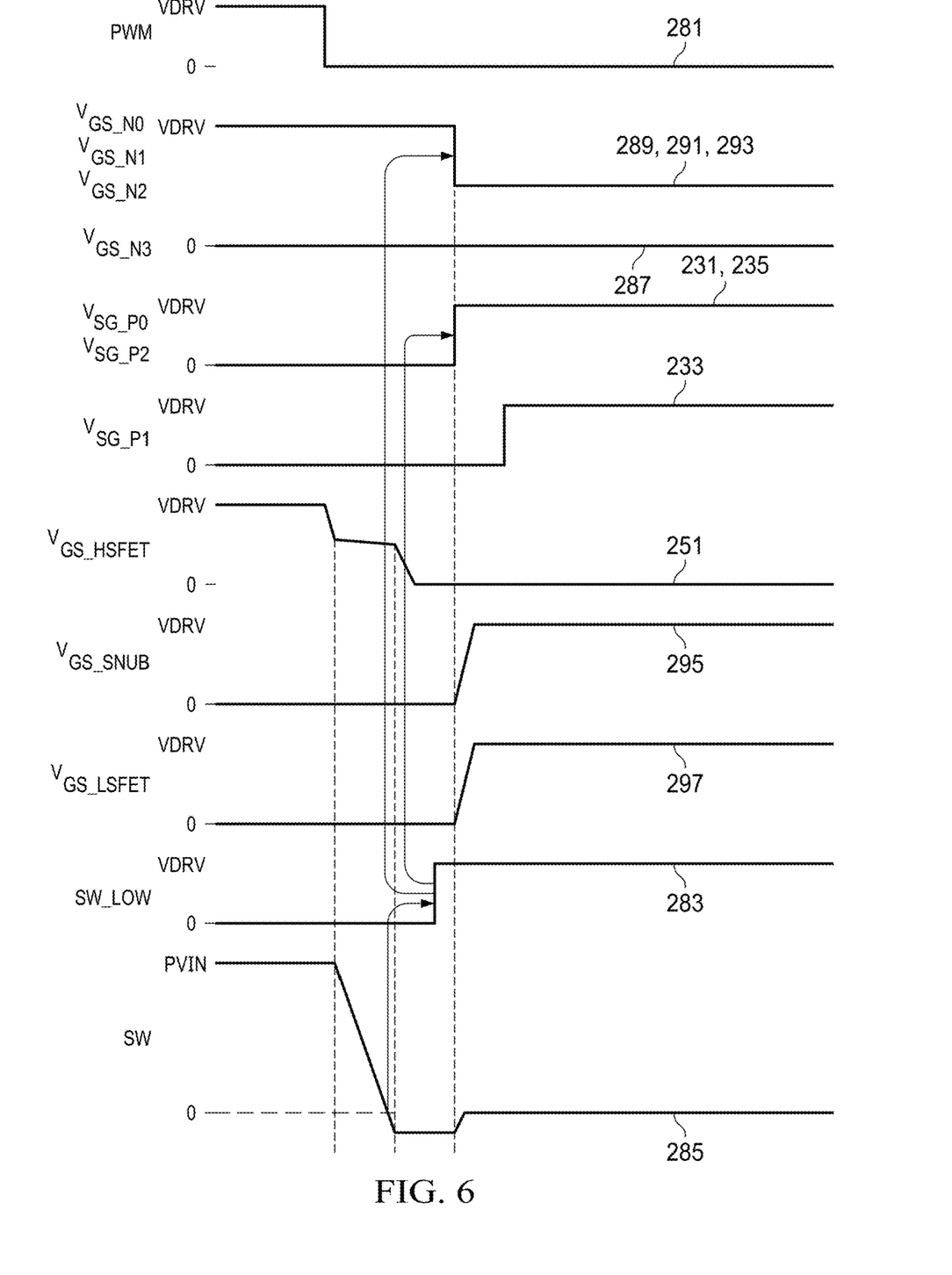
FIG. 6 is a timing diagram of example signals in the buck switching regulator of FIG. 2 during a low-side switching transistor turn-on sequence with positive peak current.

FIG. 6 is a timing diagram of example signals in the buck switching regulator 200 during a low-side switching transistor 204 turn-on sequence with positive peak current. In FIG. 6, a falling edge of the PWM signal 281 initiates the turn-on sequence. The inductor current direction signal 279 (not shown in FIG. 6) is a logic high to indicate positive inductor current. The high-to-low transition of the PWM signal 281 triggers the timing control logic circuit 246 to turn off the high-side switching transistor 202 ($V_{GS}$_HFET) via the level shifter 250. With turn off of the high-side switching transistor 202, the switch node voltage 285 starts to fall. When the switch node voltage 285 is less than the threshold voltage, the comparator 260 activates the SW_LOW signal 283. A rising edge of the 283 causes the timing control logic circuit 246 to turn off the pull-down transistor 218, the pull-down transistor 220, and the pull-down transistor 226 ($V_{GS}$_N2 signal 289, $V_{GS}$_N1 signal 291, and $V_{GS}$_N0 signal 293). The rising edge of the 283 also causes the timing control logic circuit 246 to turn on the pull-up transistor 230 ($V_{SG}$_P2 231) and the pull-up transistor 234 ($V_{SG}$_P0 235), thereby turning on the snubber transistor 206 ($V_{GS}$_SNUB signal 295) and the low-side switching transistor 204 ($V_{GS}$_LSFET signal 297). A predetermined delay time (e.g., about 35 nanoseconds delay time) after activation of the pull-up transistor 230, the timing control logic circuit 246 activates the pull-up transistor 232 ($V_{SG}$_P1 233).

Figure 7:
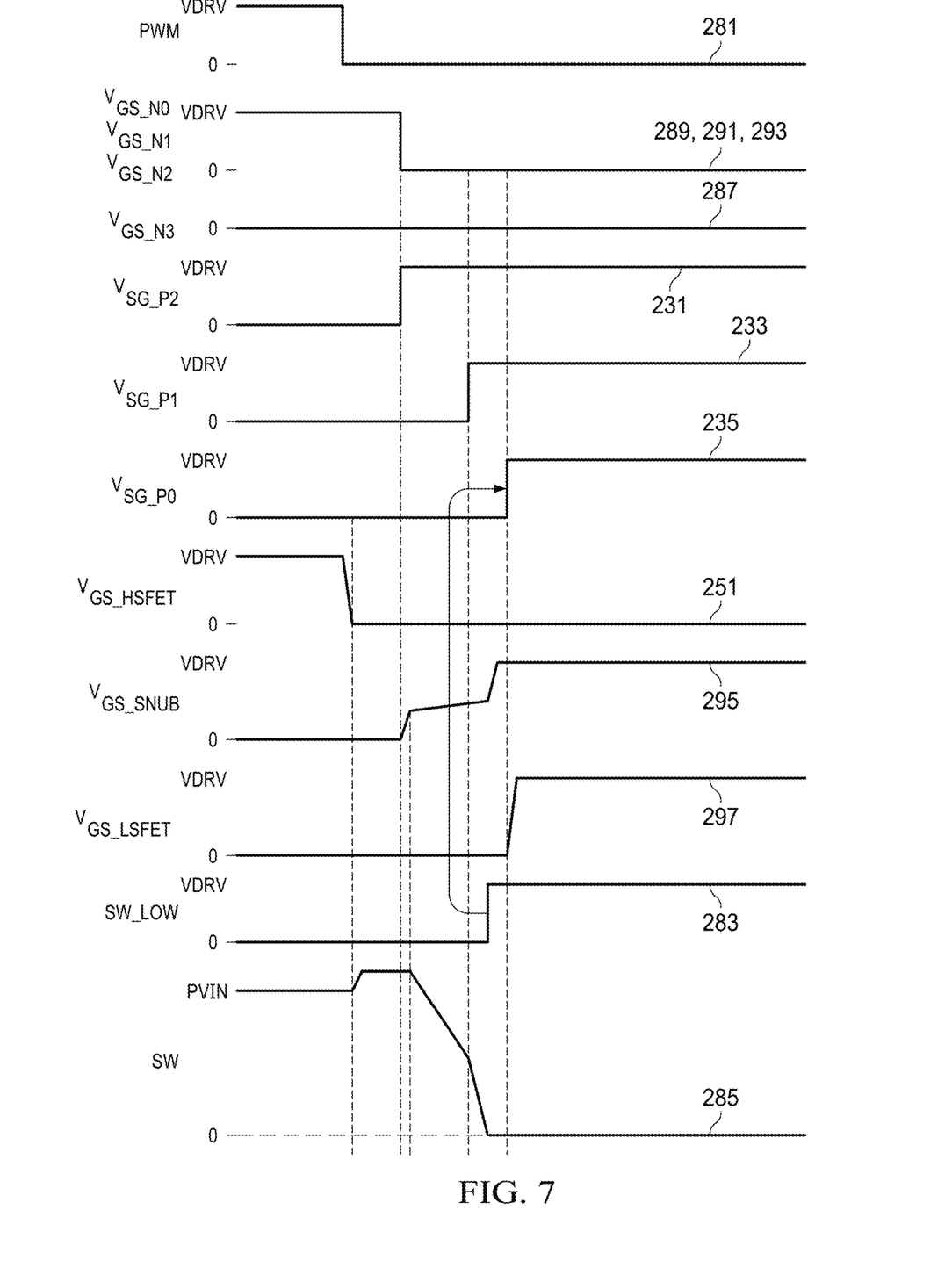
FIG. 7 is a timing diagram of example signals in the buck switching regulator of FIG. 2 during a low-side switching transistor turn-on sequence with negative peak current.

FIG. 7 is a timing diagram of example signals in the buck switching regulator 200 during a low-side switching transistor 204 turn-on sequence with negative peak current. In FIG. 7, a falling edge of the PWM signal 281 initiates the turn-on sequence. The inductor current direction signal 279 (not shown in FIG. 7) is a logic low to indicate negative inductor current. Responsive to the high-to-low transition of the PWM signal 281 the timing control logic circuit 246 turns off of the high-side switching transistor 202 ($V_{GS}$_HFET), and the switch node voltage 285 starts to fall. The timing control logic circuit 246 turns off the pull-down transistors 226, 220, and 218 ($V_{GS}$_N2 signal 289, $V_{GS}$_N1 signal 291, and $V_{GS}$_N0 signal 293), and turns on the pull-up transistor 230 ($V_{SG}$_P2 231) a predetermined time (e.g., about 20 nanoseconds) after the falling edge of the PWM signal 281. A predetermined time (e.g., about 35 nanoseconds) after the pull-up transistor 230 is turned on, the timing control logic circuit 246 turns on the pull-up transistor 232 ($V_{SG}$_P1 233). The voltage at the gate of the snubber transistor 206 rises ($V_{GS}$_SNUB signal 295). When the switch node voltage 285 is less than the threshold voltage, the comparator 260 activates the SW_LOW signal 283. Responsive to the rising edge of the SW_LOW signal 283, the timing control logic circuit 246 turns on the pull-up transistor 234 ($V_{SG}$_P0 235), which turns on the low-side switching transistor 204 ($V_{GS}$_LSFET signal 297).

Figure 8A:
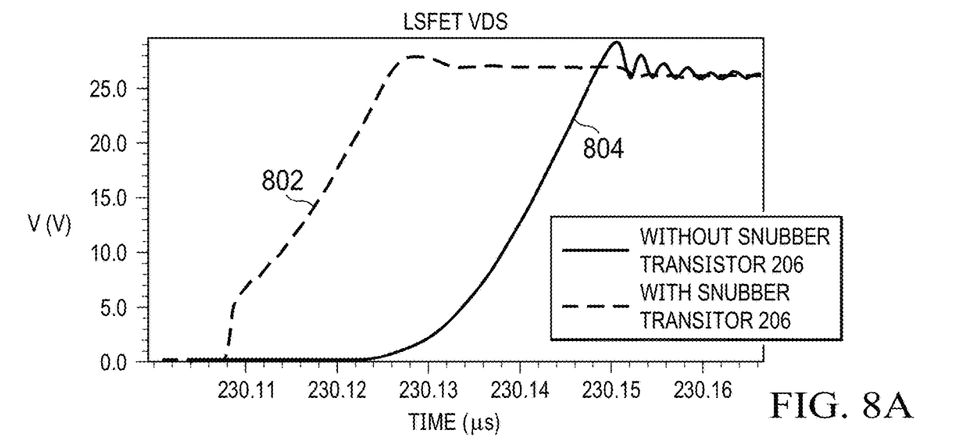
FIGS. 8A, 8B and 8C are graphs of low-side switching transistor $V_{DS}$ and $V_{GS}$ in a buck switching regulator, with negative valley current, with and without the snubber transistor and the control circuit of FIG. 2.
Figure 8B:
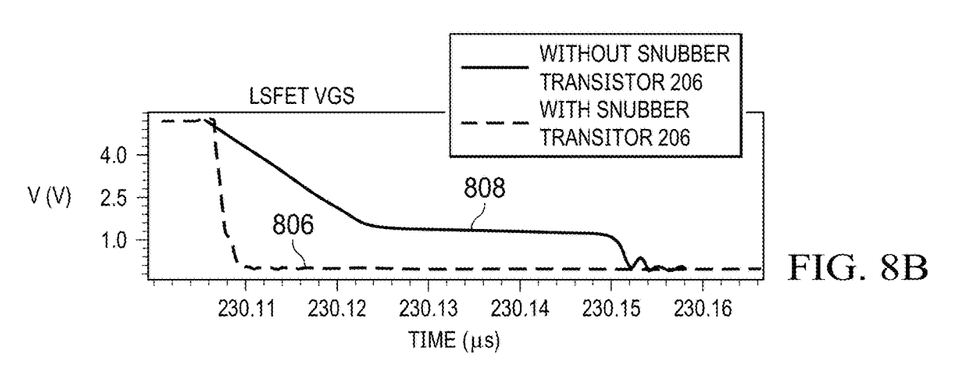
Figure 8C:
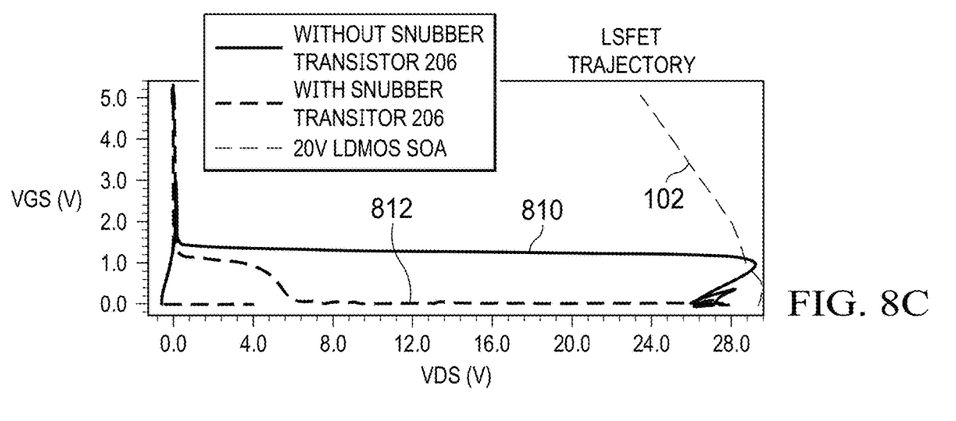

FIGS. 8A, 8B and 8C are graphs of low-side switching transistor $V_{DS}$ and $V_{DS}$ in a buck switching regulator, with negative valley current, with and without the snubber transistor 206 and the control circuit 208. FIG. 8A shows the $V_{DS}$ 802 of the low-side switching transistor 204, and the $V_{DS}$ 804 of a low-side switching transistor without the snubber transistor 206 and the control circuit 208. FIG. 8B shows the $V_{GS}$ 806 of the low-side switching transistor 204, and the $V_{GS}$ 808 of a low-side switching transistor without the snubber transistor 206 and the control circuit 208. FIG. 8C shows $V_{DS}$ versus $V_{GS}$ for the low-side switching transistor 204 as curve 812, and $V_{DS}$ versus $V_{GS}$ without the snubber transistor 206 and the control circuit 208 as curve 810. The safe operating area of the low-side switching transistor 204 is illustrated as curve 102. FIG. 5C shows that, at turn-off of the low-side switching transistor with negative valley current, the buck switching regulator 200 operates within the safe operating area of the low-side switching transistor 204, while operation is outside the safe operating area without the snubber transistor 206 and the control circuit 208.

Figure 9A:
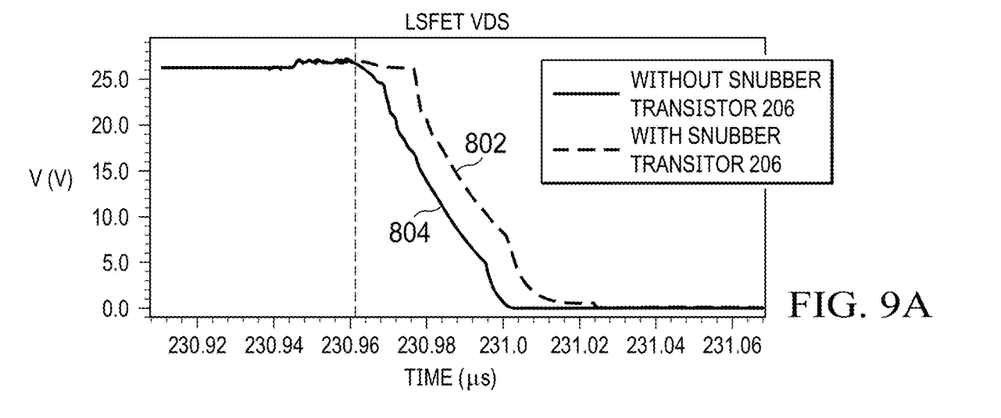
FIGS. 9A, 9B and 9C are graphs of low-side switching transistor $V_{DS}$ and $V_{GS}$ in a buck switching regulator, with negative peak current, with and without the snubber transistor and the control circuit of FIG. 2.
Figure 9B:
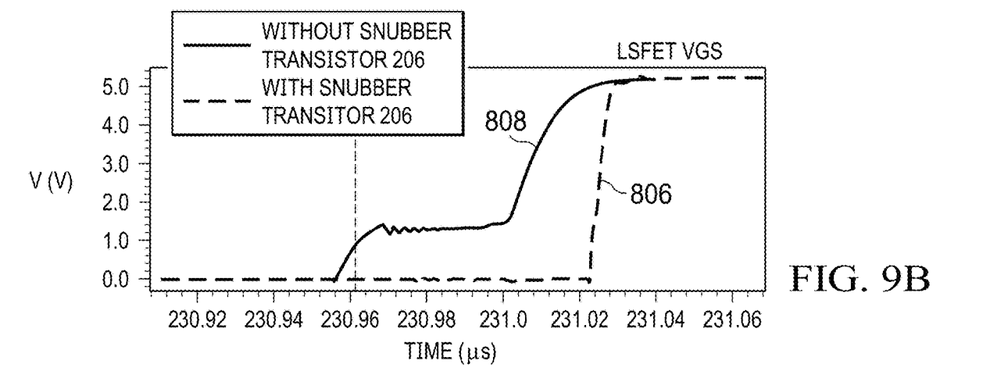
Figure 9C:
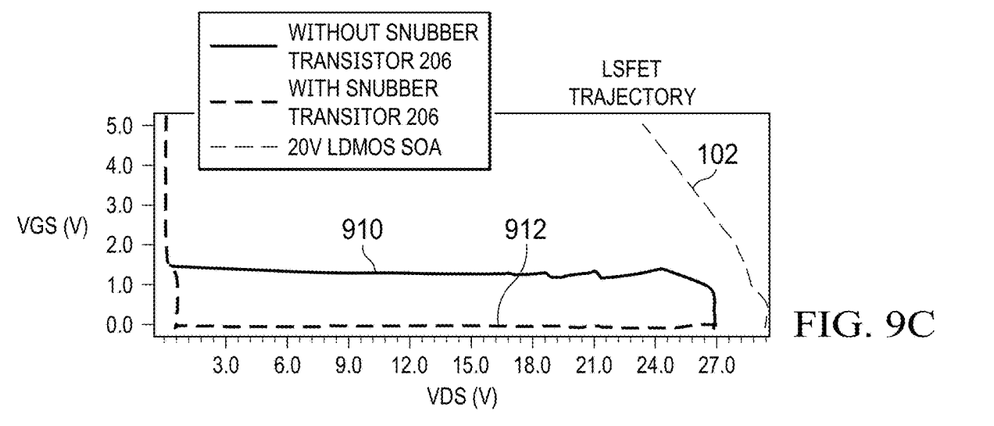

FIGS. 9A, 9B and 9C are graphs of low-side switching transistor $V_{DS}$ and $V_{GS}$ in a buck switching regulator, with negative peak current, with and without the snubber transistor 206 and the control circuit 208. FIG. 9A shows the $V_{DS}$ 802 of the low-side switching transistor 204, and the $V_{DS}$ 804 of a low-side switching transistor without the snubber transistor 206 and the control circuit 208. FIG. 9B shows the $V_{GS}$ 806 of the low-side switching transistor 204, and the $V_{GS}$ 808 of a low-side switching transistor without the snubber transistor 206 and the control circuit 208. FIG. 9C shows $V_{DS}$ versus $V_{GS}$ for the low-side switching transistor 204 as curve 912, and $V_{DS}$ versus $V_{GS}$ without the snubber transistor 206 and the control circuit 208 as curve 910. The safe operating area of the low-side switching transistor 204 is illustrated as curve 102. FIG. 9C shows that, at turn-off of the low-side switching transistor with negative peak current, the buck switching regulator 200 operates with more margin within the safe operating area of the low-side switching transistor 204 than an implementation that lacks the snubber transistor 206 and the control circuit 208.

Figure 10:
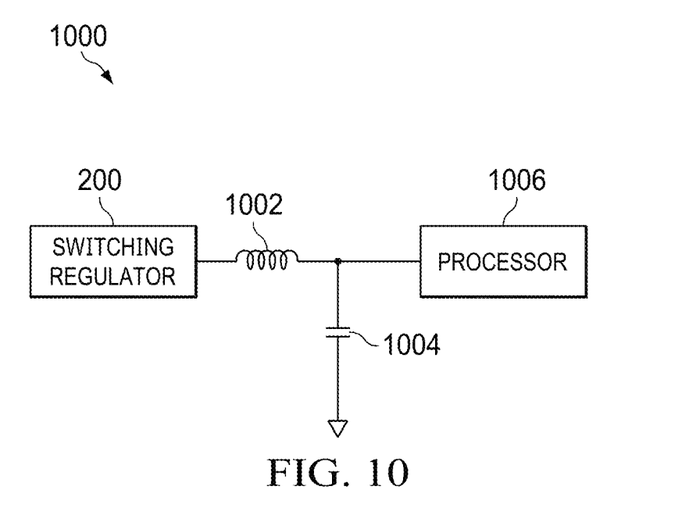
FIG. 10 is a block diagram for a processor circuit that includes the buck switching regulator of FIG. 2.

FIG. 10 is a block diagram for a processor circuit 1000. The 1000 includes the buck switching regulator 200, an inductor 1002, a capacitor 1004, and a processor 1006. The inductor 1002 includes a first terminal coupled to the switching node 212 of the buck switching regulator 200, and a second terminal coupled to a first terminal of the capacitor 1004 and power input terminal of the processor 1006. The buck switching regulator 200 may provide a voltage used to power any of the various subsystems of the processor 1006. For example, the buck switching regulator 200 may provide the voltage used to power a communication interface (e.g., a universal serial bus) implemented by the processor 1006.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-channel field effect transistor ("PFET") may be used in place of an n-channel field effect transistor ("NFET") with little or no changes to the circuit. Furthermore, other types of transistors may be used (such as bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:
1. A circuit, comprising:
    a first transistor including:
        a first current terminal; and
        a second current terminal coupled to a ground terminal;
    a second transistor including:
        a first current terminal coupled to the first current terminal of the first transistor;
        a second current terminal coupled to the ground terminal; and
        a control terminal;
    a third transistor coupled between the control terminal of the second transistor and the ground terminal; and
    a fourth transistor coupled between the control terminal of the second transistor and the ground terminal.

2. The circuit of claim 1, wherein:
the third transistor includes:
a first current terminal coupled to the control terminal of the second transistor; and
a second current terminal coupled to the ground terminal; and
the circuit includes a first resistor coupled between the first current terminal of the third transistor and the control terminal of the second transistor.

3. The circuit of claim 2, wherein:
the fourth transistor includes:
a first current terminal coupled to the control terminal of the second transistor; and
a second current terminal coupled to the ground terminal; and
the circuit includes a second resistor coupled between the first current terminal of the fourth transistor and the control terminal of the second transistor.

4. The circuit of claim 3, wherein a resistance of the second resistor is greater than a resistance of the first resistor.

5. The circuit of claim 1, further comprising:
a fifth transistor coupled between the control terminal of the second transistor and the ground terminal.

6. The circuit of claim 1, further comprising a sixth transistor coupled between the control terminal of the second transistor and a terminal configured to include a drive voltage.

7. The circuit of claim 6, further comprising a seventh transistor coupled between the control terminal of the second transistor and the terminal.

8. The circuit of claim 7, further comprising an eighth transistor coupled between the terminal and the control terminal of the first transistor.

9. The circuit of claim 1, further comprising:
a fifth transistor coupled between the control terminal of the first transistor and the ground terminal.

10. The circuit of claim 1, wherein:
the first transistor is a low-side switching transistor of a switching regulator;
the second transistor is a snubber transistor configured to conduct current in parallel with the low-side switching transistor;
the third transistor is a first pull-down transistor; and
the fourth transistor is a second pull-down transistor.

11. An integrated circuit, comprising:
a first transistor including:
a current terminal; and
a control terminal;
a second transistor including:
a current terminal coupled to the current terminal of the first transistor; and
a control terminal;
a control circuit coupled to the first transistor and the second transistor, and including:
a third transistor coupled to the control terminal of the second transistor;
a fourth transistor coupled to the control terminal of the second transistor;
a fifth transistor coupled to a control terminal of the first transistor;
wherein, in a turn-off sequence of the first transistor, the control circuit is configured to:
activate the third transistor to turn off the second transistor;
activate the fourth transistor in conjunction with the third transistor;
deactivate the third transistor after a predetermined time, while the fourth transistor remains active; and
activate the fifth transistor to turn off the first transistor responsive to a voltage at the control terminal of the second transistor being less than a predetermined voltage.

12. The integrated circuit of claim 11, wherein:
the control circuit includes a sixth transistor coupled to the control terminal of the second transistor; and
in the turn-off sequence of the first transistor, the control circuit is configured to:
activate the sixth transistor responsive to activation of the fourth transistor.

13. The integrated circuit of claim 12, wherein:
the third transistor is configured to sink more current than the fourth transistor or the sixth transistor; and
the sixth transistor is configured to sink more current than the fourth transistor.

14. The integrated circuit of claim 13, wherein:
the control circuit includes:
a seventh transistor coupled to the control terminal of the second transistor; and
an eighth transistor coupled to the control terminal of the second transistor.

15. The integrated circuit of claim 14, wherein:
in a turn-on sequence of the first transistor, the control circuit is configured to:
activate the seventh transistor to turn on the second transistor; and
activate the eighth transistor a predetermined time after activation of the sixth transistor.

16. The integrated circuit of claim 14, wherein the seventh transistor is configured to source more current than the sixth transistor.

17. The integrated circuit of claim 14, wherein:
the control circuit includes:
a ninth transistor coupled to the control terminal of the first transistor.

18. A device, comprising:
an inductor;
a first transistor including:
a first current terminal coupled to the inductor;
a second current terminal coupled to a ground terminal; and
a control terminal;
a second transistor including:
a first current terminal coupled to the inductor;
a second current terminal coupled to the ground terminal; and
a control terminal; and
a control circuit coupled to the first transistor, and the second transistor, the control circuit including:
a third transistor coupled between the control terminal of the second transistor and the ground terminal;
a fourth transistor coupled between the control terminal of the second transistor and the ground terminal;
a fifth transistor coupled between the control terminal of the second transistor and the ground terminal; and
a sixth transistor coupled between the control terminal of the first transistor and the ground terminal.

19. The device of claim 18, wherein:
the control circuit includes:
a first resistor coupled between the fourth transistor and the control terminal of the second transistor; and
a second resistor coupled between the fifth transistor and the control terminal of the second transistor; and a resistance of the second resistor is greater than a resistance of the first resistor.

20. The device of claim 18, wherein the control circuit is configured to:
  activate the third transistor for a predetermined time;
  activate the fourth transistor in conjunction with the third transistor;
  activate the sixth transistor responsive to a control voltage at the control terminal of the second transistor being below a predetermined voltage; and
  activate the fifth transistor responsive to activation of the fourth transistor and positive current flow through the inductor.

\* \* \* \* \*